US008652355B2

(12) United States Patent
Klier et al.

(10) Patent No.: US 8,652,355 B2
(45) Date of Patent: Feb. 18, 2014

(54) SELF-ADHESIVE BASE POLYMER FOR ELECTROLUMINESCENCE MASSES

(75) Inventors: Daniel Klier, Reinbek (DE); Berit Guse, Neumünster (DE)

(73) Assignee: tesa SE, Hamburg (DE)

( * ) Notice: Subject to any disclaimer, the term of this patent is extended or adjusted under 35 U.S.C. 154(b) by 342 days.

(21) Appl. No.: 12/993,749

(22) PCT Filed: Dec. 3, 2009

(86) PCT No.: PCT/EP2009/066380
§ 371 (c)(1),
(2), (4) Date: Dec. 14, 2010

(87) PCT Pub. No.: WO2010/072542
PCT Pub. Date: Jul. 1, 2010

(65) Prior Publication Data
US 2011/0074279 A1    Mar. 31, 2011

(30) Foreign Application Priority Data

Dec. 16, 2008    (DE) .......................... 10 2008 062 129

(51) Int. Cl.
*C09K 11/00* (2006.01)
*C09J 133/00* (2006.01)
(52) U.S. Cl.
USPC ................ 252/301.35; 252/301.36; 428/690; 428/917; 156/67; 156/326

(58) Field of Classification Search
USPC ................ 252/301.35, 301.36; 428/690, 917; 156/67, 326
See application file for complete search history.

(56) References Cited

U.S. PATENT DOCUMENTS

| 3,213,341 | A | * | 10/1965 | Scotti et al. ................... 428/463 |
| 3,214,622 | A | * | 10/1965 | Fetter et al. ................... 313/502 |
| 2004/0254450 | A1 | | 12/2004 | Griffin | |
| 2010/0032625 | A1 | * | 2/2010 | Kupsky et al. ........... 252/301.27 |

FOREIGN PATENT DOCUMENTS

| EP | 0 399 680 A2 | | 11/1990 |
| JP | 2002-38120 | * | 2/2002 |
| WO | WO 2007/107591 | * | 9/2007 |

OTHER PUBLICATIONS

Translation for JP 2002-38120, Feb. 6, 2002.*
International Search Report (ISR) dated Mar. 9, 2010.

* cited by examiner

*Primary Examiner* — Carol M Koslow
(74) *Attorney, Agent, or Firm* — Norris McLaughlin & Marcus PA

(57) ABSTRACT

Self-adhesive polymer having a relative permittivity of more than 4.5 useful as a matrix of a self-adhesive electroluminescence mass.

6 Claims, No Drawings

SELF-ADHESIVE BASE POLYMER FOR ELECTROLUMINESCENCE MASSES

This is a 371 of PCT/EP2009/066380 filed 3 Dec. 2009 (international filing date), and claiming priority of German Application 10 2008 062 129.3, filed Dec. 16, 2008.

The invention lies within the field of polymer technology and concerns a self-adhesive polymer for use in electronic devices, a self-adhesive with this polymer, an electroluminescent composition with this self-adhesive, self-adhesive sheetlike elements with such an adhesive or electroluminescent composition, and an electroluminescent device with this electro-luminescent composition. The invention further concerns the use of the self-adhesive in the bonding of components of an electronic device, and the use of the electroluminescent composition in the bonding of components of optical display devices and/or lighting devices.

BACKGROUND OF THE INVENTION

Self-adhesives are used as processing assistants in many technical fields, allowing different components of a system to be joined with one another in a simple way. The term "self-adhesive" encompasses pressure-sensitive adhesives and hot-melt adhesives, in other words all adhesives which inherently allow adhesive bonding to the substrate in question. These self-adhesives may be used in different ways. For reasons of ease of handling, self-adhesives are employed typically in the form of coatings of self-adhesive that are part of a self-adhesive sheetlike element, in the form, for example, of a self-adhesive tape in roll form, or in the form of a thin, extruded self-adhesive film, which can be obtained without using solvents. Coatings of self-adhesive, furthermore, can also be produced when the self-adhesive is applied as a liquid solution or dispersion in a coating step or printing operation.

Particularly for use in electronic devices, the requirements imposed on self-adhesives are very high. As well as low outgassing, the self-adhesives ought to be able to be used within a wide temperature range, and ought to have particular optical and electrical properties. In view of the increasing miniaturization of electronics, a fundamental objective with coatings of adhesive is to realize further functions within the layer of adhesive, in addition to the adhesive bonding capacity, in order thereby to allow savings to be made in terms of operating steps during the manufacture of the devices. By this means, furthermore, it is possible to dispense with additional functional elements, thereby reducing the size and weight of the assembly in question.

Highly functionalized self-adhesives and self-adhesive tapes are used in different electronic and electrical components. In rigid or flexible miniaturized electronic circuits, for instance, they allow signal coupling or decoupling of components and their component parts; as a result of their high flexibility, the self-adhesives exhibit a high long-term stability, even under mechanical deformation, and at the same time are easy to process, and can therefore be used even on irregularly shaped surfaces.

Self-adhesives and self-adhesive tapes are used more particularly for the bonding of display systems, and in the case, for example, of liquid-crystal displays (LCDs) with additional functional layers, or of touch-sensitive displays (touch panels) in cell phones, computer screens, televisions, and compact computers such as notebooks, laptops or personal digital assistants (PDAs).

In recent years, in view of the significantly lower energy consumption, light sources based on luminescent emitters have increased in importance for these display devices. In contrast to thermal emitters, such as incandescent lamps, for example, the light emitted in light sources of this kind is generated as part of luminescence processes which occur within a phosphor. Luminescence is the term for a process in which an excited phosphor undergoes transition, with emission of electromagnetic radiation, to a state of lower energy (radiative deactivation). In practice, systems that are of interest as luminescent emitters are more particularly those where the excitation of the phosphor takes place in an electrical field. The accompanying emission of light and other electromagnetic radiation is referred to as electroluminescence. Another technical utilization of electroluminescence besides light-emitting diodes (LEDs) is that of what are called capacitor-type luminous films. With the capacitor-type luminous films (electroluminescent or EL film, luminescent sheet, luminous film), the phosphor is located between two electrodes in a special capacitor arrangement. The phosphor is excited by application of an electrical alternating field to the electrodes.

For capacitor-type luminous films as well it is possible to use self-adhesives which have a multiple-functionality setup. For example, DE 10 2006 013 834 A1 discloses a pressure-sensitive adhesive which is used as a binder matrix for electroluminescent phosphor. As examples of pressure-sensitive adhesives which can be used in principle, said document gives a general recitation of different adhesive systems, as for instance those based on poly(meth)acrylates, silicones, polysiloxanes, synthetic rubbers, polyurethanes, and also adhesive systems based on block copolymer.

DE 10 2006 013 834 A1 is particularly comprehensive in its description of poly(meth)acrylate-based self-adhesives, i.e., self-adhesives which comprise as their base polymer a polymer formed from a (meth)acrylate monomer mixture (the term "(meth)acrylate" serves below for a simplified description and includes not only acrylates but also methacrylates, in other words their acids and their derivatives, esters, for example). Said document cites, more particularly, mixtures which, at 70% to 100% by weight of the monomer mixture, comprise one or more (meth)acrylic esters esterified with alkyl alcohols having 1 to 30 C atoms, and which, furthermore, may optionally have not more than 30% by weight of one or more olefinically unsaturated monomers with functional groups. In practice it has been found that, where these self-adhesive systems are used with commercial phosphors, electroluminescent devices of good luminous power and long-term stability can be produced.

It is an object of the present invention to provide a base polymer for a self-adhesive which, as a binder matrix in an electroluminescent device, offers an even greater luminous power and also an improved long-term stability by comparison with polymers known from the prior art.

SUMMARY OF THE INVENTION

This object is achieved, surprisingly, by a polymer of the type specified at the outset, whose relative permittivity, in accordance with the invention, is more than 4.5. It has been ascertained that with a pressure-sensitively adhesive polymer having a relative permittivity (permittivity, relative dielectric constant; formula symbol: $\in_r$) at this level, the luminous density of a self-adhesive electroluminescent composition produced with this polymer is significantly higher, for a given layer thickness of the electroluminescent composition, than with the self-adhesive electroluminescent composition systems known to date.

In one advantageous embodiment, the self-adhesive polymer is a polymer formed from a monomer mixture which comprises (meth)acrylic acid derivatives each having at least one functional group from the group consisting of cyano groups and nitro groups. By using these monomers it is possible to obtain polymers which on the one hand are self-adhesive and on the other hand have a relative permittivity which can be varied over a wide range by altering the mass fraction of these monomers in the resultant polymer. It is important when using these particular monomers, however, that they are present in the polymer in a mass fraction of at least 45% by weight, so as to give a polymer having the relative permittivity of more than 4.5 as required in accordance with the invention.

DETAILED DESCRIPTION

The suitability of these highly polar monomers for producing self-adhesive polymers was found entirely unexpectedly. Such polar monomers are typically used in order to obtain polymers having a particularly strong internal hold (cohesion), as is desired especially when the articles bonded using these polymers are to be repositionable. To the skilled worker, however, it is likewise known that increasing the cohesion generally goes hand in hand with a reduction in the bond strength and initial tack of the polymers. It was surprising, therefore, that, using (meth)acrylate monomers with cyano groups and/or nitro groups, a highly polar polymer is obtained which has a high cohesion and at the same time possesses a high bond strength and initial tack. It has emerged as being particularly favorable in this context if the (meth)acrylic acid derivatives having at least one cyano group and/or nitro group are present in the self-adhesive polymer in a mass fraction of not more than 90% by weight, since in the case of higher mass fraction the resultant polymers are no longer sufficiently self-adhesive to be able to serve as the base polymer for a self-adhesive. In particular it is found that the polymers are still outstandingly pressure-sensitively adhesive up to a level of such monomers of around 70% by weight, are still excellently hotmelt-adhesive up to a level of around 80% by weight, and are just still hotmelt-adhesive at a level between 80% and 90% by weight. Depending on the specific application, self-adhesive polymers outstandingly suitable as the base polymer for a self-adhesive which at the same time has an excellent luminous density are obtained particularly when the mass fraction of the (meth)acrylic acid derivatives having at least one cyano group and/or nitro group is between 50% and 60% by weight.

Particularly good results are achieved if the polymer comprises monomers selected from the group consisting of unsubstituted or substituted cyanomethyl acrylate, cyanoethyl acrylate, cyanomethyl methacrylate, cyanoethyl methacrylate, and (meth)acrylic acid derivatives with O-(per)cyanoethylated saccharides. In this case, self-adhesive polymers are obtained which have a significantly higher long-term stability than conventional self-adhesive polymers. This is manifested in a relative permittivity of the polymer that remains at least substantially constant over a significantly longer time period, and, furthermore, in a considerably slower decrease in the luminous density over time when these polymers are used in electroluminescent compositions.

It is of advantage, furthermore, if the self-adhesive polymer is a polymer formed from a monomer mixture which further comprises substituted and/or unsubstituted (meth) acrylic esters of the general formula $CH_2=CR^1-COOR^2$, where $R^1$ is selected from the group consisting of H and $CH_3$, and $R^2$ is selected from the group consisting of substituted and unsubstituted alkyl chains having 1 to 20 carbon atoms. In this way a self-adhesive polymer is obtained whose technical adhesive properties can be varied over a wide range and thus tailored to the specific applications. Even better variation possibilities for the technical adhesive properties are produced if the self-adhesive polymer is a polymer formed from a monomer mixture which further has olefinically unsaturated monomers with functional groups.

The central aspect of this invention relates to an improved base polymer for a self-adhesive which is used as a binder matrix in an electroluminescent device. Consequently, a further, specific problem addressed by the present invention was that of providing a self-adhesive which, as a binder matrix in an electro-luminescent device, affords an increased luminous power and also an improved long-term stability. In accordance with the invention, for the purpose of solving this problem, a self-adhesive is used which possesses a relative permittivity of more than 4.5. This embodiment of the self-adhesive offers the advantage over conventional adhesives of a significantly higher luminous density and of a longer lifetime for an electroluminescent device produced using this self-adhesive.

It is particularly advantageous in this context if the base polymer used for this self-adhesive is the self-adhesive polymer described above, and so the advantages recited above are also obtained, correspondingly, for the self-adhesive.

In particular it is of advantage here if the self-adhesive overall has a relative permittivity of less than 25. In this way it is possible to minimize the dielectric losses (imaginary component of the permittivity) in the case of electroluminescence, allowing a particularly favorable balance to be obtained between very high luminous density on the one hand and very low loss performance on the other.

Furthermore, in accordance with the present invention, the use of the above-described self-adhesive is proposed for the bonding of components of an electrical device, thereby allowing functional devices with particularly low installed height to be realized. With a view to ease of handling, moreover, it has been found advantageous for the self-adhesive to be present in a self-adhesive sheetlike element.

A further aspect of the present invention was based on the problem of providing a self-adhesive electro-luminescent composition which, compared to conventional self-adhesive electroluminescent compositions, not only possesses an increased luminous density but is also able to offer this luminous density over a longer time period. This is achieved, in accordance with the invention, by an electroluminescent composition which in addition to a phosphor comprises the self-adhesive described above.

In accordance with the present invention, further, the use of the above-described self-adhesive electro-luminescent composition is proposed for the bonding of components of optical display devices and/or lighting devices, thus offering the advantage of a dual-functional system, and meaning that separate fastening means are not required. With regard to this electro-luminescent composition as well it has emerged as being particularly favorable if this composition, for the purpose of greater ease of bonding, is present in a self-adhesive sheetlike element.

In this context it was likewise sensible for the mass fraction of the particulate phosphor in the self-adhesive electroluminescent composition to be between 1% and 90% by weight, since with a phosphor content of less than 1% by weight it is no longer possible to achieve visually perceptible brightness even for thick layers of the electroluminescent composition, whereas, at a higher phosphor content, the electroluminescent composition does not possess sufficiently high internal cohesion and also does not possess sufficient bond strength, and consequently, at a phosphor content of more than 90% by weight, it is not possible to realize sufficient self-adhesive properties. The electro-luminescent composition is particularly advantageous when it has a phosphor content of between 40% and 75% by weight, since in this case a high luminous density is obtained and, moreover, good self-adhesiveness is achieved as well. An optimal balance between these two contradictory effects is offered by a phosphor content between 55% and 65% by weight.

It is favorable, furthermore, if a phosphor based on encapsulated zinc sulfide is used as particulate phosphor. In this way the stability of the phosphor is significantly increased and thus the lifetime of the electroluminescent composition is improved, this being the average time period within which the decrease in luminous density achievable for a voltage is less than half the initial luminous density at that voltage. By encapsulating the phosphor particles it is possible to protect them from exposure to substances which reduce the luminosity, such as from corrosive agents, for example, or from adsorptive agents which, as adsorbates on the particle surface, may form centers for radiation-less recombination events.

It was a further problem addressed by the present invention, finally, to provide an improved electroluminescent device which is simple to manufacture and at the same time has a high luminous density and long-term stability. This problem has been solved through use of the electroluminescent composition of the invention in an electroluminescent device which additionally has an at least substantially transparent first electrode and a second electrode.

The present invention therefore provides an innovative class of self-adhesive polymers. A substance is termed self-adhesive for the purposes of this specification when it is of pressure-sensitive adhesive or holtmelt-adhesive configuration, in other words inherently permitting long-term adhesive bonding to the bond substrate. Accordingly, the term "self-adhesive" encompasses both pressure-sensitive adhesives and hotmelt adhesives.

A polymer is said to be pressure-sensitively adhesive if it permits bonding to the substrate at room temperature even under a relatively weak applied pressure. Conversely, a polymer is said to be hotmelt-adhesive if it enters into an adhesive bond with the substrate only at elevated temperatures, the resulting bond being retained even when the bond is subsequently cooled to room temperature. The bondability of both pressure-sensitively adhesive polymers and hotmelt-adhesive polymers derives from their adhesive properties.

Adhesion typically refers to the physical effect brought about by the holding-together of two phases, brought into contact with one another, at their interface on account of intermolecular interactions that occur there. Adhesion therefore defines the attachment of the polymer or of an adhesive to the substrate surface, and can be determined as tack and as bond strength. While the adhesion of a polymer is dependent solely on its molecular structure and therefore constitutes an intrinsic variable of the specific polymer, in adhesives the polymer may be present in a form in which it is blended with further components. In order to influence the adhesion of an adhesive in a specific way, it is common to add plasticizers and/or bond strength-increasing resins (referred to as tackifiers) to the adhesive.

Cohesion typically refers to the physical effect which results in the internal holding-together of a substance or composition on account of intermolecular and/or intramolecular interactions. The forces of cohesion therefore determine the consistency and fluidity of the adhesive, which can be determined, for instance, as viscosity and as shear resistance time. Cohesion as well is set by the molecular structure of the polymer, and it is possible to increase the cohesion in a specific way by subjecting the polymer or adhesive to additional crosslinking, for which the polymer or adhesive must have reactive (and therefore crosslinkable) constituents (which in the case of an adhesive may also be added separately as chemical crosslinkers), and/or the adhesive is subjected to actinic (high-energy) radiation in an aftertreatment.

The technical adhesive properties of a pressure-sensitively adhesive polymer are determined primarily by the relationship between adhesional and cohesional properties. For certain applications, for example, it is important that the polymers used are highly cohesive, i.e., possess a particularly strong internal holding-together, whereas for other applications a particularly high adhesion is required.

Critical to the present invention is that the polymer not only is self-adhesive but also has a relative permittivity of more than 4.5. These two properties are intrinsic properties of the polymer, in other words properties of the polymer itself and not, for instance, properties brought about exclusively through auxiliaries; this does not, however, rule out the possibility of a polymer having the corresponding properties being present in a mixture with auxiliaries, which influence those properties still further.

The majority of conventional polymers have a relative permittivity of around 3 and are, therefore, not suitable for implementing the inventive teaching. Besides the reaction parameters during the polymerization that are relevant for the reaction process—such as, for example, the reaction temperature, the reaction time, the reactor pressure, the metering profile of the monomers, initiators, chain transfer agents, and solvents, the type of stirrer used, the stirrer speed, and the viscosity and pH of the reaction mixture—the selection of the monomers (or else, where appropriate, of the macromonomers) in particular may have a strong influence on the relative permittivity of the resultant polymer. The corresponding monomers may be selected such that the polymerization produces a self-adhesive polymer on a polyurethane, acrylate, synthetic rubber, polysiloxane or polyester basis.

Thus, for example, a high relative permittivity may be attained when the polymer is prepared from monomers singly or multiply substituted by halogens. In this context, however, it should be ensured that the polymer is self-adhesive. Thus, for example, polyvinylidene fluorides may have a sufficiently high relative permittivity, without being self-adhesive, and hence they are not normally suitable as polymer of the invention. Corresponding compounds which can serve as monomers for polymers having a high relative permittivity, however, are sufficiently known to the skilled worker. Among such compounds, in accordance with the invention, and in addition to fluorine-substituted compounds, monomers which have proven particularly favorable are those substituted singly or multiply by nitro groups ($-NO_2$) or by cyano groups ($-CN$).

For the case of an acrylate-based polymer (that is, a polymer prepared from a monomer mixture containing at least 50% by weight of monomers whose backbone can be traced back to acrylic acid or methacrylic acid), for example, a relative permittivity of more than 4.5 is obtained when the polymer is prepared from a monomer mixture containing at least 45% by weight of monomers each having one or more cyano groups and/or nitro groups, it being possible for these monomers to be present more particularly in a mass fraction of not more than 90% by weight, or even only in a mass fraction of between 50% and 60% by weight. These polymers may be of any desired architecture, for instance as block copolymers or random polymers.

As (meth)acrylic acid derivatives containing at least one nitro group it is possible in principle to use all customary and suitable compounds. Equally, all customary and suitable compounds may be selected in principle as (meth)acrylic acid derivatives containing at least one cyano group. When using monomers which contain cyano groups, a particularly polar polymer is obtained which, however, is neither moisture-sensitive or water-soluble nor hygroscopic and exhibits at most a low water absorption. Monomers with cyano groups that can be used are, for instance, those of the general formula $CH_2=C(R^a)(COOR^b)$, where $R^a$ represents H in the case of acrylic acid or a derivative of acrylic acid, and represents $CH_3$ in the case of methacrylic acid or a derivative of methacrylic acid, and where $R^b$ is a radical deriving from the general formula $-(CH_2)_c-CH(CN)-(CH_2)_d-H$, where c can be 0 to 10 and d can be 0 to 10, i.e., for example—and without this recitation constituting any restriction—cyanomethyl acrylate, cyanoethyl acrylate, cyanomethyl methacrylate and cyanoethyl methacrylate. In addition to or instead of these cyanoalkyl (meth)acrylates it is also possible to use other cyano-functionalized (meth)acrylic acid derivatives, as for example those in which the above radical $R^b$ comprises an O-(per)cyanoethylated sugar unit (i.e., a saccharide in which one hydroxyl group, two or more hydroxyl groups or all the hydroxyl groups is or are present in cyanoethanol ether form), examples being O-percyanoethylated 2-(glycosyloxy)ethyl acrylate or corresponding di-, oligo- and poly-saccharides. Instead of or in addition to glucose it is of course also possible with these compounds to start from other saccharides, such as from mannose, xylose, and the like.

Instead of using monomers with cyano groups and/or nitro groups, however, it is also possible to produce a (meth) acrylate-based, pressure-sensitively adhesive polymer using other monomers which likewise exhibit a high relative permittivity, examples being vinylidene halides, in which the above radical $R^b$ derives, for example, from the general formula $-(CH_2CX_2)_n-CH_3$, where n is 1 to 50 and X is selected from the group consisting of F, Cl, and Br.

In this way, accordingly, polymers may be obtained which not only are self-adhesive and exhibit a corresponding relative permittivity but also have outstanding insulation properties, low (or—for specialty applications—high) loss factors, and high optical transparencies.

Besides such (meth)acrylate-based polymers, however, it is also possible in principle to use any other polymers which are typically employed for self-adhesives. In this context mention may be made, for example, of self-adhesive polymers based on polysiloxanes, on polyester, on synthetic rubber and/or on polyurethane, without this indication constituting any unnecessary restriction. Suitable pressure-sensitive adhesive polymers also include those on a block copolymer basis, such as acrylate block copolymers or styrene block copolymers. Adhesives of this kind are sufficiently known from the prior art, and in these adhesives as well, the relative permittivity may be specifically increased through the use of functionalized monomers with cyano, halogen or nitro groups.

Pressure-sensitively adhesive polymers contemplated include in principle all polymer systems having suitable pressure-sensitive adhesive properties, i.e., pressure-sensitively adhesive systems. The monomers serving to prepare the pressure-sensitively adhesive polymers are selected in particular such that the resultant polymers can be used, at room temperature or higher temperatures, as pressure-sensitive adhesives (PSAs).

A polymer is pressure-sensitively adhesive for the purposes of the present invention when it possesses pressure-sensitive adhesive properties in accordance with the "Handbook of Pressure Sensitive Adhesive Technology" by Donatas Satas (van Nostrand, New York 1989).

In order to obtain a polymer glass transition temperature $T_g \leq 25°$ C., as is preferred for pressure-sensitively adhesive polymers, the monomers are typically selected, and the quantitative composition of the monomer mixture is selected, such that their behavior, in analogy to the equation presented by Fox (cf. T. G. Fox, Bull. Am. Phys. Soc. 1 (1956) 123), is such that the desired value for the glass transition temperature $T_g$ of the resulting polymer is given by $$\frac{1}{T_g} = \sum_n \frac{w_n}{T_{g,n}} \tag{E1}$$

In this equation, n represents the serial number of the monomers used, $w_n$ the mass fraction of the respective monomer n (% by weight), and $T_{g,n}$ the respective (static) glass transition temperature of the homopolymer of each of the monomers n, in K.

Pressure-sensitively adhesive polymers contemplated include in principle all pressure-sensitively adhesive polymers, examples being those based on acrylates and/or methacrylates, silicones and/or synthetic rubbers, with the proviso that they meet the requirements relating to the relative permittivity of the resulting polymer.

Thus it is possible in particular to use pressure-sensitively adhesive polymers based on acrylic acid and/or methacrylic acid and/or based on esters of the aforementioned compounds, or those based on hydrogenated synthetic rubbers, since these polymers are particularly stable toward ageing.

Especially suitable are acrylate-based polymers which are obtainable for instance by radical polymerization and which comprise at least one acrylic monomer of the general formula $CH_2=C(R^1)(COOR^2)$, where $R^1$ is H or a $CH_3$ radical and $R^2$ is H or is selected from the group consisting of saturated, unbranched and branched, substituted and unsubstituted $C_1$ to $C_{20}$ alkyl radicals.

Specific examples, without this recitation constituting any restriction, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate and their branched isomers, examples being isobutyl acrylate, 2-ethylhexyl acrylate, 2-ethylhexyl methacrylate, isooctyl acrylate or isooctyl methacrylate.

Further classes of compound which can be used, but which are typically used only in a low amount-of-substance fraction, are monofunctional acrylates and methacrylates where the radical $R^2$ is selected from the group of bridged or nonbridged cycloalkyl radicals having at least six carbon atoms. The cycloalkyl radicals may also be substituted, by $C_1$ to $C_6$ alkyl groups, for example. Specific examples are cyclohexyl methacrylate, isobornyl acrylate, isobornyl methacrylate and 3,5-dimethyladamantyl acrylate.

One preferred procedure uses acrylic monomers and/or comonomers which contain one or more substituents, especially polar substituents, examples being carboxyl, sulfonic acid, phosphonic acid, hydroxyl, lactam, lactone, N-substituted amide, N-substituted amine, carbamate, epoxy, thiol, alkoxy, and ether groups.

According to one advantageous embodiment, furthermore, it is possible to use polymers prepared from a monomer mixture which in addition to the acrylic monomer contains olefinically unsaturated monomers with functional groups, as comonomers. These monomers may be selected, for example, from the group consisting of vinyl compounds having functional groups (examples being vinyl esters, vinyl ethers, vinyl halides, vinylidene halides, vinyl compounds with aromatic rings and heterocycles in alpha position), maleic anhydride, styrene, styrene compounds, vinyl acetate, acrylamides, and photoinitiators functionalized with a double bond, without this recitation constituting any restriction.

Monomers of fundamental suitability as functional comonomers are moderately basic comonomers such as singly or doubly N-alkyl-substituted amides, especially acrylamides. Specific examples here are N,N-dimethyl-acrylamide, N,N-dimethylmethacrylamide, N-tert-butyl-acrylamide, N-vinylpyrrolidone, N-vinyllactam, dimethylaminoethyl acrylate, dimethylaminoethyl methacrylate, diethylaminoethyl acrylate, dimethyl-aminoethyl methacrylate, N-methylolacrylamide, N-methylolmethacrylamide, N-(butoxymethyl)methacryl-amide, N-(ethoxymethyl)acrylamide, and N-isopropyl-acrylamide, this recitation not being conclusive.

Other preferred examples of such comonomers (in a likewise nonconclusive recitation) are hydroxyethyl acrylate, hydroxyethyl methacrylate, hydroxypropyl acrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl acrylate, 2-butoxyethyl methacrylate, glyceryl methacrylate, 6-hydroxyhexyl methacrylate, vinylacetic acid, tetrahydrofurfuryl acrylate, beta-acryloyloxypropionic acid, trichloroacrylic acid, fumaric acid, crotonic acid, aconitic acid, and dimethylacrylic acid.

In a further preferred procedure, comonomers used are vinyl compounds, especially vinyl esters, vinyl ethers, vinyl halides, vinylidene halides, and vinyl compounds with aromatic rings and heterocycles in alpha position, with nonexclusive examples being, for instance, vinyl acetate, vinylformamide, 4-vinylpyridine, ethyl vinyl ether, vinyl chloride, vinylidene chloride, styrene, N-vinylphthalimide, methylstyrene, 3,4-dimethoxy-styrene, 4-vinylbenzoic acid, and acrylonitrile.

With particular advantage the at least one comonomer may be a photoinitiator having a copolymerizable double bond, selected more particularly from the group consisting of Norrish I photoinitiators, Norrish II photoinitiators, benzoin acrylates or acrylated benzophenones.

Accordingly, a polymer of the invention may also, for example, encompass a pressure-sensitively adhesive polymer which in relation to the monomer mixture has 70% to 100% by weight of one or more acrylic esters and/or methacrylic esters of the formula $CH_2=C (R^1) (COOR^3)$, where the radical $R^1$ represents the substituents H and/or $CH_3$ and the radical $R^3$ represents alkyl chains having 1 to 30 C atoms, and which optionally has up to 30% by weight of one or more olefinically unsaturated monomers with functional groups.

In order specifically to improve the adhesional properties of the polymer, the polymerization mixture is admixed with monomers which reduce the (static) glass transition temperature $T_g$ of the resultant polymer in accordance with formula E1; examples of such monomers, whose homopolymers have a particularly low glass transition temperature, are propyl acrylate, butyl acrylate, isobutyl acrylate, 2-ethylhexyl acrylate, lauryl acrylate, n-hexyl methacrylate or n-octyl methacrylate, without this recitation constituting any restriction.

The average molecular masses $M_n$ of the PSAs prepared from the polymers of the invention are situated very preferably within a range from 20 000 g/mol to 2 000 000 g/mol. Particularly for further use as hotmelt PSAs, polymers are used with molecular masses $M_n$ that are situated preferably within a range from 100 000 g/mol to 500 000 g/mol. An outstanding tradeoff is offered by a noncrosslinked polymer having a molecular mass $M_n$ of 1 000 000 g/mol.

This figure for the average molecular mass $M_n$ relates to a determination made by gel permeation chromatography, by introducing 100 µl of a sample (sample concentration 4 g/l) subjected to clarifying filtration, with a mixture of 0.1% by volume trifluoroacetic acid in tetrahydrofuran as eluent, into a column combination made up of a preliminary column and a number of separating columns. The preliminary column used is a column of the type PSS-SDV (Polymer Standards Service), 5µ, $10^3$ Å, ID 8.0 mm×50 mm. For separation, with a flow rate of 1.0 ml/min, columns of the type PSS-SDV (Polymer Standards Service), 5µ, $10^3$ Å and also $10^5$ Å and $10^6$ Å, each with ID 8.0 mm×300 mm, are used (25° C.); detection was carried out by means of a differential refractometer (Shodex R171). A PMMA standard was used for calibration (polymethyl methacrylate calibration).

Also contemplated as self-adhesive polymers are polymers which do not contain (meth)acrylates, in other words for example, synthetic rubbers or silicones.

As synthetic rubber it is possible in principle to employ all customary and suitable synthetically preparable rubbers. In addition, as silicones, it is possible to employ all of the silicones that are known to the skilled worker, that meet the particular profile of requirements, and that, consequently, are also suitable. For preparing the base polymer of a silicone-based PSA it is possible, for example, for condensation-crosslinking polymer systems, such as silicate resins, polydimethylsiloxanes or polydiphenyl-siloxanes, addition-crosslinking polymer systems, such as silicate resins, polydimethylsiloxanes or polydiphenylsiloxanes each further comprising crosslinker substances (for example, hydrosilanes substituted by functional groups), to be employed, but without any restriction to these systems.

Hence, for example, for use in silicone PSAs, condensation-crosslinking polymer systems are available commercially under the names DC 280™ (dispersion of polydimethylsiloxane gum and resin in xylene), DC 282™ (dispersion of polydimethylsiloxane gum and resin in xylene and toluene), Q2-7735™ (dispersion of siloxane gum and silicone resin in xylene), DC 7358™ (dispersion of polydimethylsiloxane gum and resin in Xylene), and Q2-7406™ (dispersion of polydimethylsiloxane gum and resin in xylene) from Dow Corning, PSA 518™ (a xylene solution of phenyl based polysiloxane gum and resin), and PSA 910™ (a toluene solution of polysiloxane gum and resin) from GE Bayer Silicones, KRT 001™, KRT 002™ and KRT 003™ (solutions of orqanopolysiloxane in toluene from ShinEtsu, and addition-crosslinking polymer systems are available commercially under the names DC 7657™ (a polydimethyl siloxane gum and resin dispersed in xylene) and DC 2013™ (a reactive silicone polymer liquid) from Dow Corning, PSA 6574™ (a toluene solution of phenyl based polysiloxane gum and resin) from GE Bayer Silicones or KR 3701™ (a solution of orqanopolysiloxane in toluene from ShinEtsu, without the subject matter of the invention being restricted by the recitation.

It is also possible in principle, furthermore, to use those silicones (without thereby imposing a restriction in terms of the choice of specific silicones) which, when employed as base polymers in a PSA, are chemically or physically crosslinkable and are crosslinked in the PSA for the application. These may more particularly be silicones which can be crosslinked in a radical reaction. By this means, the consequences of a time-dependent ageing of the silicone-based PSA are significantly reduced, and this is reflected in an increasing cohesion and a reduced adhesion. Such radical crosslinking may be brought about, for example, chemically, through the use of so-called BPO derivatives (derivatives of benzoyl peroxide), and/or through the use of electron beams in a so-called electron-beam cure (EBC).

From silicones it is also possible, among others, to obtain PSAs which exhibit a high bond strength to apolar substrates or to siliconized and/or silicone-containing substrates, as for instance to silicone rubbers and/or silicone foams. Silicone-based PSAs of this kind may be obtained from silicones by methods including the conclusive crosslinking of the adhesive by means of electron-beam curing, and this offers a multiplicity of advantages: For instance, the radicals generated by the electron-beam cure lead to crosslinking of the silicone-based PSA. Furthermore, as a consequence of an electron-beam cure, a solid bond can be achieved between the PSA and the corresponding (apolar) substrate to which the PSA is adhered (a PET film, for example). As a result of this, the otherwise possible migration of constituents of the adhesive assembly toward the plane of the bond, said constituents possibly having plasticizing properties and therefore resulting in a reduction in bond strength within the adhesive bond, is significantly reduced, and a change in properties is prevented, and so the PSA retains it high level of temperature stability.

The polymer of the invention may alternatively be designed to have hotmelt adhesiveness. As hotmelt-adhesive polymers, in principle, all polymer systems having suitable hotmelt-adhesive properties, i.e., hotmelt-adhesive systems, are contemplated. A polymer is hotmelt-adhesive for the purposes of the present invention if, following application in the form of a melt to the substrate, and subsequent cooling, the bond strength at room temperature in accordance with ASTM D 3330-04 (with a peel speed of 300 mm/min on the substrate to be bonded), is greater than 1 N/cm, more particularly greater than 3 N/cm or ever greater than 5 N/cm.

As hotmelt-adhesive polymer of the invention it is possible to use all customary and suitable hotmelt-adhesive polymers, examples being those based on synthetic rubbers, on thermoplastic materials, on elastomers with modifying resins, on acrylic acid derivative-vinyl copolymers, and on acrylate-containing block copolymers.

Among the self-adhesive polymers, those which have emerged as being possible for use in principle, among others, include those from the group consisting of polyolefins and copolymers of polyolefins and also their acid-modified derivatives, ionomers, polyamides, and copolymers thereof, and also block copolymers such as styrene block copolymers.

With regard to the hotmelt-adhesive properties, these polymers may be subjected to subsequent crosslinking. A high degree of crosslinking can be obtained, for instance, in a crosslinking step with electron beams. Typical irradiation equipment that may be employed includes linear cathode systems, scanner systems, or segmented cathode systems, in the case of electron-beam accelerators. A comprehensive description of the state of the art, and the most important process parameters, are found in Skelhorne, "Electron Beam Processing, in Chemistry and Technology of UV and EB Formulation for Coatings, Inks and Paints", Vol. 1, 1991, SITA, London. Typical acceleration voltages are situated in the range between 50 kV and 500 kV, preferably in the range between 80 kV and 300 kV. The scatter doses employed range between 5 kGy to 150 kGy, more particularly between 20 kGy and 100 kGy. It is also possible to use other methods which permit high-energy irradiation.

In order to reduce the radiation dose needed for a crosslinking reaction, the hotmelt-adhesive polymer may be prepared from a monomer mixture which further comprises crosslinkers and/or crosslinking promoters, more particularly those which can be excited thermally or by means of electron beams. Suitable crosslinkers for electron beam crosslinking are, for instance, difunctional or polyfunctional acrylates or methacrylates, or triallyl cyanurates and triallyl isocyanurates. Thermally activatable crosslinkers that are used are preferably difunctional or polyfunctional epoxides, hydroxides, isocyanates or silanes.

A further aspect of the present invention concerns a self-adhesive having a relative permittivity of more than 4.5. Self-adhesives are adhesives which exhibit self-adhesion, in other words pressure-sensitively adhesive adhesives (pressure-sensitive adhesives) and hotmelt-adhesive adhesives (hotmelt adhesives). Adhesives comprise at least one base polymer, and additionally there may where appropriate be further formulating ingredients present, examples being other polymers or fillers. The base polymer of an adhesive is a polymer whose fundamental properties determine the technical adhesive properties of the adhesive as a whole, although it is of course not impossible that the overall properties of the adhesive are additionally influenced through use of modifying auxiliaries or additives, or other polymers, in the adhesive. At its most simple, an adhesive is composed solely of its base polymer.

In accordance with the invention the adhesive possesses a relative permittivity of more than 4.5, more particularly a relative permittivity of between 4.5 and 25. The adhesive may comprise the self-adhesive polymer described above. However, where the adhesive, in addition to this polymer, contains exclusively those further formulating ingredients whose relative permittivity is low, it is necessary to use a polymer having a correspondingly higher relative permittivity, so that the relative permittivity of the self-adhesive overall exceeds a figure of 4.5.

The self-adhesives of the invention can likewise be realized by using a self-adhesive polymer having a relative permittivity which is lower than 4.5. In this case, however, the self-adhesive must additionally comprise other formulating ingredients, such as additives, for instance, which themselves possess a high relative permittivity. These formulating constituents must then be present in sufficiently large quantity to give the self-adhesive overall a relative permittivity of more than 4.5. For this reason it is preferred to use additives whose relative permittivity is particularly high and which at the same time have a low water content, in order to lessen the incidence of any degradation processes on the part of the phosphors, or the incidence of water adsorption on the surface of the phosphor particles; these additives may be, for example, inorganic fillers or organic additives.

Examples of inorganic fillers which can be used in principle include—without any restriction thereto—strontium titanate particles or barium titanate particles, which must be present at sufficiently high concentration in the self-adhesive to realize the inventive concept. Advantageously, those particle systems are used which have a very small average particle diameter, preferably in the nanometer range. In this way it is possible to obtain a self-adhesive which possesses a high bond strength and in which there is little light scattering. Accordingly, a particularly transparent self-adhesive is obtained, into which the phosphor can later be incorporated with particular ease, and likewise obtained is a corresponding electro-luminescent composition, featuring a particularly high luminous density that can be perceived from the outside.

Examples of organic additives include—without any consequent restriction—polymeric additives, such as halogenated polymers, which exhibit high compatibility and also good miscibility with common solvents. Included here more particularly are polymers based on polyvinylidene fluoride, polyacrylonitrile (PAN), cellulose, poly(butadiene-co-acrylonitrile), poly(iminoadipoyl-iminohexamethylene), poly(imino-hexamethylene-iminosebacoyl), polyvinyl acetate, poly[imino(1-oxododecamethylene)], poly[imino(1-oxohexamethylene)], polypropylene glycol, polyethylene glycol, polysulfones, polyurethanes, polyetheramides, vinylidene fluoride-hexafluoropropylene copolymers, vinylidene fluoride-chlorotrifluoroethylene copolymers, or vinylidene fluoride-hexafluoropropylene-chloro-trifluoroethylene terpolymers. In order to improve the technical adhesive properties of these polymers, they can be blended (compounded) with resins which exhibit a high permittivity, as for example with appropriately modified unsaturated and saturated hydrocarbon resins, terpene-phenolic resins, rosin-based resins, and polyterpene resins composed of alpha-pinene and/or beta-pinene and/or delta-limonene units.

In addition to the base polymer, therefore, the self-adhesive may also comprise further formulating constituents and/or adjuvants. Besides the formulating constituents which increase the relative permittivity of the adhesive, these may be, for example, auxiliaries, pigments, rheological additives, additives for improving the adhesion, plasticizers, resins, elastomers, ageing inhibitors (antioxidants), light stabilizers, UV absorbers, optical brighteners, and also other auxiliaries and additives, examples being driers (for instance molecular sieve zeolites or calcium oxide), flow agents and flow control agents, wetters such as surfactants, or catalysts.

As auxiliaries it is possible to use all finely ground solid adjuvants such as, for example, chalk, magnesium carbonate, zinc carbonate, kaolin, barium sulfate or calcium oxide. Further examples are talc, mica, silica or silicates. It is of course also possible to use mixtures of the substances stated.

The pigments employed may be organic or inorganic in nature. All kinds of organic or inorganic color pigments are contemplated, examples being white pigments for improving the light stability and UV stability.

Examples of rheological additives are fumed silicas, phyllosilicates (for example, bentonites), high molecular mass polyamide powders, or powders based on castor oil derivatives.

Additives for improving the adhesion may be, for example, substances from the groups of the polyamides, epoxides or silanes.

Examples of plasticizers for improving the adhesiveness are phthalic esters, trimellitic esters, phosphoric esters, adipic esters, and esters of other acyclic dicarboxylic acids, fatty acid esters, hydroxycarboxylic esters, alkylsulfonic esters of phenol, aliphatic, cycloaliphatic, and aromatic mineral oils, hydrocarbons, liquid or semisolid rubbers (for example, nitrile rubbers or polyisoprene rubbers), liquid or semisolid polymers of butene and/or isobutene, acrylic esters, polyvinyl ethers, liquid resins and plasticizer resins based on the raw materials which also constitute the basis for tackifying resins, lanolin and other waxes, silicones, and also polymer plasticizers such as polyesters or polyurethanes, for instance.

Optical brighteners are compounds which absorb light from the ultraviolet region of the spectrum and exhibit fluorescent emission in the visible region of the spectrum, preferably at wavelengths of about 400 nm to about 500 nm, the fluorescence masking an absorption by the self-adhesive itself that occurs in the same wavelength range, and so causing the self-adhesive overall to have an optically brighter appearance. Examples of such, without this recitation constituting any restriction, include stilbene derivatives, ethylene derivatives, coumarin derivatives, naphthalimide derivatives or pyrazole derivatives. They may be added to the self-adhesive in pure form or as a mixture of different optical brighteners.

The formulating of the adhesive with further constituents such as auxiliaries and plasticizers, for example, is likewise prior art.

Furthermore, for the purpose of optimizing the technical properties of the self-adhesives of the invention, it is possible for resins to be admixed. Tackifying resins for addition (resins boosting the bond strength) that can be used include, without exception, all known tackifier resins that are described in the literature. Representatives include the pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$ to $C_9$ and other hydrocarbon resins. Any desired combinations of these and further resins may be used in order to adjust the properties of the resultant adhesive in accordance with requirements. Generally speaking, it is possible to use all resins that are compatible with (soluble in) the base polymer in question, reference being made in particular to all aliphatic, aromatic, and alkylaromatic hydrocarbon resins, hydrocarbon resins based on pure monomers, hydrogenated hydrocarbon resins, functional hydrocarbon resins, and natural resins.

The self-adhesive of the invention may be used to bond components of electronic devices. These may in principle be all components, examples being casing parts, protective or viewing windows, or parts of the electronic circuits, made of any of the materials customary for these purposes, more particularly polymers, glass, ceramic, and metals. As an important functional example, mention may also be made of the adhesive bonding of capacitor electrodes, in which case the self-adhesive of the invention, as well as fixing the electrodes, also serves as a dielectric, and therefore there is no need for a phosphor to be included.

In the simplest case—when the high permittivity of the self-adhesive is an intrinsic quality of the base polymer—the self-adhesive may be composed solely of the base polymer, without featuring further adjuvants. The most simple polymer—although not the optimum polymer for the majority of applications—is therefore an intrinsically pressure-sensitively adhesive homopolymer having the appropriate permittivity. Advantageously, however, the self-adhesive of the invention is used as a constituent of an electro-luminescent composition which in the simplest case is composed of the self-adhesive and luminescent particles or nonparticulate phosphor.

The self-adhesive of the invention may be applied to a temporary or permanent carrier or else directly to the substrate. Suitable for this purpose in principle are all of the methods known to the skilled worker, such as, for instance, coating from the melt (following concentration beforehand, for example), from dispersion or from solution. For applying the self-adhesives from a solution, the self-adhesive is dissolved in a suitable solvent. For this purpose, in addition to the conventionally used solvents such as acetone, benzine, ethyl acetate, methyl ethyl ketone, ethanol, isopropanol or toluene, higher-boiling solvents may also be advantageous, such as, for example, ethylene glycol monoethyl ether acetate, diethylene glycol monoethyl ether acetate, ethylene glycol monoethyl ether, diethylene glycol monoethyl ether, diethylene glycol diacetate, ethylene glycol monomethyl ether acetate, methylglycol acetate, and ethylene glycol monoacetate. In the choice of solvent, important factors are the high coatability of the polymer solution on the respective substrate, and also the high compatibility with the polymer or polymer mixture. Correspondingly with the respective coating method, the solids content can be varied.

The self-adhesive may therefore be present as part of an electroluminescent composition. An electro-luminescent composition is a chemical composition whose design is such that, when it is introduced into an electrical field of sufficiently high field strength, emits electromagnetic radiation generated in an electroluminescence process. Accordingly, therefore, an electroluminescent composition necessarily includes electroluminescent centers which are embedded into the self-adhesive of the invention as a dielectric matrix. In the present case, for example, these electro-luminescent additions may be a particulate phosphor in the electroluminescent composition. For this purpose, the electroluminescent composition may be admixed in particular with electroluminescent fillers and/or afterglow particles.

Phosphors may be added, for example, to the monomer mixture to be polymerized itself, to the base polymer obtained in the course of the polymerization, or only when the self-adhesive is blended, as may take place, for example, in a solvent process, preferably using solvents having a very low water content. In an alternative procedure, the phosphor may also be incorporated homogeneously into the melted PSA within a hotmelt process. For this purpose, any residues of solvent present in the melt are removed in a concentrating extruder, and the phosphor particles are added to the self-adhesive in the solvent-free or low-solvent state.

The mass fraction of the phosphor in the electro-luminescent composition may be selected for arbitrary suitability, and in the system of the invention is typically between 1% and 90%, preferably between 40% and 75%, more particularly between 55% and 65%, by weight.

Phosphors which can be used include all known and suitable systems; these systems are based frequently on silicates or on doped II/VI semiconductors such as, for instance, zinc sulfide. Commercial electroluminescent pigments are available, for instance, under the GLACERGLO™ (encapsulated electro-luminescent phosphors) name from OSRAM Sylvania, in different colors, such as in blue, blue-green, green, orange, and white, for example. To improve the long-term stability of the electroluminescent phosphor particles, which are sometimes sensitive to moisture, they may be surrounded with a thin layer of a wide band-gap inert material, and hence take the form of encapsulated particles, examples being doped zinc sulfide particles enveloped with aluminum oxide and having an average diameter in the range from 30 μm to 40 μm.

An electroluminescent composition of this kind may be used for adhesive bonding of components of optical display devices and/or lighting devices, in other words, for instance, of electronic components, housing parts, viewing windows, and the like. Occupying the foreground among these possible applications, however, is the use of the electroluminescent composition as an electroluminescent light source. A light source of this kind is employed in electroluminescent devices, i.e., in devices which generate light in an electroluminescence process, as for example in lamps and other electrical lighting devices. Purely by way of example, reference may be made here to the application as a large-area lighting device, which with low luminous density in long-term operation enables indirect room lighting, in the form, for example, of a light carpet or as background lighting in liquid-crystal display screens. Furthermore, such lighting devices are also used in functional applications, for instance as night lighting or emergency lighting, as illuminated advertising media, as a decorative element in interior fitment, as a self-lighting display sign, or for actively lighting pixels in a display device, such as a mobile display, a computer monitor or television, for instance.

An electroluminescent device typically has at least two electrodes, which are at a distance from one another and are each in electrically conducting connection with a connection lead. Disposed in the space between the electrodes, in accordance with the invention, is an electroluminescent composition. When an electrical alternating field is applied to the electrodes, the phosphor is excited and so converted into a state of higher energy; relaxation then takes place with emission of electromagnetic radiation. In order to maximize the intensity of illumination, it is necessary for the electrical field gradient at the location of the phosphor particles to be particularly high. The electromagnetic radiation emitted is preferably in the range of the wavelengths of visible light, in the range of the ultraviolet spectrum or in the range of the wavelengths of infrared radiation. In accordance with the invention it is also possible for two or more of these electroluminescent devices to be arranged alongside one another, in the form, for instance, of a specifically drivable grid (freely selectable display) or in the form of fixed shape structures. Typical operating voltages for such electroluminescent devices are in the range from 20 V to about 400 V for a frequency of 50 Hz to 1 kHz, without any restriction thereto.

In principle, an electroluminescent device may possess different structures. Having proven sensible in practice is an arrangement in which the electrodes and the electroluminescent composition are present in the form of a coating of at least three layers, namely a lower electrode, a coating of electroluminescent composition, and an upper electrode.

The electrodes may be composed of all customary and suitable electrically conductive materials, for instance of metals (such as, for example, aluminum, silver, copper or gold), of electrically conducting polymers (such as, for example, those with poly(3,4-ethylenedioxythiophene (PEDOT), such as Baytron™), or of electrically conducting polymer blends (such as, for example, polymers with graphite or carbon-black admixtures), more particularly an electrically conductive adhesive. In this case it is particularly advantageous if the upper electrode (front electrode) is at least substantially transparent, in the form for example of an indium-tin oxide layer (ITO layer), an antimony-doped tin dioxide layer (ATO), a fluorine-doped tin dioxide layer (FTO) or an aluminum-doped zinc oxide layer (AZO). These layers may be present, for example, on an optically transparent support, such as a rigid glass support or a flexible film support, or else may be provided as unsupported coatings, such as a nanostructured powder—composed of indium-tin oxide powder, for example. The lower electrode (back electrode) may be identical to or different from the upper electrode and may in that case be composed, for instance, of a metallic foil, a nonwoven web or mesh. It is of course also possible to use combinations of these materials as electrodes, and hence it is possible, for instance, to use an indium-tin oxide layer in combination with an organic conductive polymer coating (for example, a coating comprising PEDOT) as upper electrode and/or as lower electrode, thereby permitting a significant increase in the flexibility of an otherwise relatively brittle indium-tin oxide layer. The geometric form of the electrodes is chosen to correspond to the specific end use.

With the construction described above it is possible to produce particularly thin electroluminescent devices, for instance those with a thickness totaling 100 μm or less. Although, at an operating voltage of 50 V, the thickness of the layer of electroluminescent composition is of primary significance for the attainable brightness of the electroluminescent device, it is necessary at higher operating voltages—for example, with an alternating voltage of 230 V—for the layer to be thick enough to prevent voltage breakdown and hence irreversible damage to the electroluminescent device. High layer thicknesses require in turn that the electroluminescent composition exhibit very little absorption and scattering at the wavelengths of the emitted radiation.

Both the self-adhesive and the electroluminescent composition may be applied, in accordance with the invention, directly to the substrate, or else used as part of a self-adhesive sheetlike element. Sheetlike elements for the purposes of this specification include in particular all customary and suitable structures having a substantially two-dimensional extent. They permit adhesive bonding and may take a variety of forms, especially flexible forms, as an adhesive sheet, adhesive tape, adhesive label or shaped diecut. The sheetlike element may be self-adhesive on one or both sides, and may have a permanent carrier or else be of carrier-free design, as an adhesive transfer tape, for instance.

Particularly simple sheetlike element constructions may therefore consist of a carrier-free coating of the self-adhesive or electroluminescent composition of the invention, comprising a single-sidedly self-adhesive permanent carrier with the self-adhesive or electroluminescent composition of the invention, or else of a double-sidedly self-adhesive carrier, where both or at least one of the two layers of self-adhesive comprise or comprises the self-adhesive or electro-luminescent composition of the invention.

A carrier is any structural element, usually of substantially sheetlike form, which is given the function of a permanent or temporary carrier. Carriers may comprise all suitable carrier materials, for instance sheets plastics, textile sheetlike elements (for example, woven, laid, knitted, and nonwoven fabrics) or combinations of such materials, it being possible for a carrier element to be closed over its full area or to have perforations. Materials typical for such carriers include, for instance, BOPP (biaxally oriented polypropylene), MOPP (monoaxial oriented polypropylene), PET (polyethylene terephthalate), PVC (polyvinyl chloride), PU (polyurethane), PE (polyethylene), PVDF (polyvinylidene fluoride), PE/EVA (polyethylene-ethylene-vinyl acetate copolymers), and EPDM (ethene-propylene-diene terpolymers). Unlike permanent carriers, temporary carriers are made adhesion-reducing on at least one side face. As temporary carriers, it is also possible, for instance, to use release papers, examples being glassine papers, kraft papers or polyolefinically coated papers.

For the production of a sheetlike element of this kind with a self-adhesive or electroluminescent composition, all customary and suitable methods may be employed.

Thus, for example, it is possible to coat the self-adhesive or electroluminescent composition from the melt onto a temporary or permanent carrier, preferably by means of roll methods or extrusion methods, as for instance at 140° C. using a coating extruder. In the case of application to a temporary carrier, the adhesive may subsequently be joined to a permanent carrier, in a laminating step, for instance. Lastly, the resulting coating of composition can be crosslinked by exposure to electronic irradiation.

In addition to the coating of adhesive and the optional carrier, furthermore, the sheetlike element may also include further functional layers. Hence a sheetlike element of the invention may also be a laminate of two or more layers, which are, for instance, of adhesive, plastic, ceramic, indium-tin oxide and/or metal, and may additionally have further functional layers.

Further advantages and possibilities for application will be apparent from a working example selected by way of an example. For this purpose, a pressure-sensitively adhesive polymer of the invention, based on cyanoacrylate, was prepared, having a relative permittivity of more than 4.5, and two further pressure-sensitively adhesive polymers were prepared as comparative examples, namely a polymer based on cyanoacrylate and a comparative polymer without cyanoacrylates.

The relative permittivity was measured at a temperature of 23° C. in a plate capacitor with variable measuring gap, the electrode plates of said capacitor having a diameter of 60 mm. For the measurement, a sample of homogenous thickness was introduced as a dielectric into the measuring slot and was contacted, over its whole area and without interstices, with the two electrode plates. The resulting distance between the electrode plates (which ought ideally to be identical to the thickness of the specimen under test) is determined by means of a gauge. In addition, a blank measurement was carried out with the electrode plates at an identical distance apart, for which the material under test was removed, meaning that, for the blank measurement, air was used as a dielectric of known permittivity. For both the measurement and the blank measurement, the capacity of the measurement setup for a measurement frequency of 1 kHz was determined using an LCR measuring instrument (model: GWInstec LCR 821). The relative permittivity of the sample material was determined in a comparison of the two capacitances found; the calculation took place in accordance with conventional determination methods of the kind specified in standard ASTM D150, for example.

In order to prepare a cyanoacrylate-based, pressure-sensitively adhesive polymer of the invention, having a relative permittivity of more than 4.5, a glass reactor with a capacity of 2 L was charged with 300 g of a mixture of 3% by weight acrylic acid, 50% by weight 2-cyanoacrylate and 47% by weight of 2-ethylhexyl acrylate in 300 g of a solvent mixture of acetone and isopropanol in a ratio of 90:10. After the reaction solution had been degassed, with nitrogen being passed through it for forty-five minutes, with stirring, the solution was heated to a temperature of 58° C. and 0.2 g of 2,2'-azobis(2-methylbutyronitrile) (Vazo 67™ from DuPont) was added as free-radical initiator. Following the addition, the reaction solution was heated to a temperature of 75° C. and the polymerization reaction was carried out at that temperature. One hour after the beginning of the reaction, the reaction mixture was admixed with a further 0.2 g of 2,2'-azobis(2-methyl-butyronitrile). Four hours after the beginning of the reaction, the reaction mixture was diluted with 100 g of the solvent mixture. A further 100 g of the solvent mixture were added after another four hours (i.e., eight hours after the beginning of the reaction). In order to reduce the level of free-radical initiator left in the reaction mixture, the reaction mixture was admixed, at eight hours and ten hours after the beginning of the reaction, with 0.6 g in each case of bis(4-tert-butylcyclohexanyl) peroxydicarbonate (Perkadox 16™ from Akzo Nobel). Twenty-four hours after the beginning of the reaction, the polymerization reaction was ended by cooling of the reaction mixture to room temperature (23° C.). In order to produce an adhesive from the resulting polymer, the reaction product was blended with a 3% strength solution of aluminum(III) acetylacetonate in acetone (0.3% by weight, based on the mass of the polymer). The polymer thus obtained had a relative permittivity of 6.1.

A cyanoacrylate-based, pressure-sensitively adhesive polymer having a relative permittivity of less than 4.5 was likewise prepared by this process. The initial-charge mixture used here was 300 g of a mixture of 3% by weight acrylic acid, 10% by weight of 2-cyanoacrylate and 87% by weight 2-ethylhexyl acrylate, and the solvent consisted of 200 g of a solvent mixture of acetone, special-boiling-point spirit 60.95, and isopropanol, in a ratio of 47:50:3. The polymer thus obtained had a relative permittivity of 4.0.

A pressure-sensitively adhesive comparative polymer without cyanoacrylates was prepared likewise by this process. The initial-charge mixture used in this case was 400 g of a mixture of 5% by weight acrylic acid, 20% by weight methyl acrylate, and 75% by weight 2-ethylhexyl acrylate, and the solvent was composed of 266 g of a solvent mixture of acetone, special-boiling-point spirit 60.95, and isopropanol, in a ratio of 47:50:3. The polymer thus obtained had a relative permittivity of 3.0.

The three polymers were each admixed in solution with a particulate phosphor (Osram Glacier GLO43HighBrite), the phosphor being used in each case in a mass ratio of 1:1, based on the mass of the dissolved polymer. The dissolved electroluminescent compositions obtained in this way were each applied with a coating bar to a carrier as lower electrode. The carrier used was a polyester film 200 μm thick, covered on one side with a thin, electrically conductive layer of aluminum. The polymers were applied from the solution to the electrically conductive, thin silver layer of the carrier, and were dried in a drying cabinet at 120° C. After drying, all three layers had the same film thickness of 50 μm.

Finally, a transparent polyester film was laminated as a transparent electrode onto the exposed side of the self-adhesive, and this electrode had an electrically conductive indium-tin oxide layer on the side which contacts the self-adhesive within the assembly. The assembling of the lower electrode and of the transparent electrode was carried out such that each electrode protruded beyond the assembly at one side. The protruding sections of the electrodes had electrical connecting leads affixed to them by means of clamp connectors, and these leads were connected to a current/voltage source.

An alternating voltage of 100 V (400 Hz) was applied to the two electrodes of each electroluminescent device, and the intensity of the electroluminescence was assessed qualitatively. The electroluminescence observed for the electroluminescent device with the pressure-sensitively adhesive comparison polymer without cyanoacrylates, and the electroluminescence observed for the electroluminescent device with the noninventive, cyanoacrylate-based, pressure-sensitively adhesive polymer, possessed approximately the same intensity. In contrast, the electroluminescent device with the pressure-sensitively adhesive polymer of the invention displayed a considerably higher intensity. Furthermore, with the electroluminescent device of the invention, in a long-term measurement, a significantly lower decrease in electroluminescence intensity over time was determined, as compared with the other two devices.

The qualitative experiments show that the pressure-sensitively adhesive polymer of the invention is outstandingly suitable for the production of electroluminescent devices.

The invention claimed is:

1. A self-adhesive electroluminescent composition comprising 1% to 90% by weight of a particulate phosphor and a self-adhesive having a relative permittivity of more than 4.5.

2. The electroluminescent composition of claim 1, wherein the particulate phosphor is present in the electroluminescent composition in a mass fraction of between 40% and 75% by weight.

3. The electroluminescent composition of claim 1 wherein the particulate phosphor is a phosphor comprising encapsulated zinc sulfide.

4. A method for bonding components of optical display devices and/or lighting devices which comprises bonding said components with the self-adhesive electroluminescent composition of claim 1.

5. A self-adhesive sheetlike element comprising an electroluminescent composition of claim 1.

6. An electroluminescent device comprising an at least substantially transparent first electrode, a second electrode, and an electroluminescent composition of claim 1.

* * * * *